No. 851,826. PATENTED APR. 30, 1907.
E. MORROW.
BAKING PAN.
APPLICATION FILED AUG. 16, 1904.
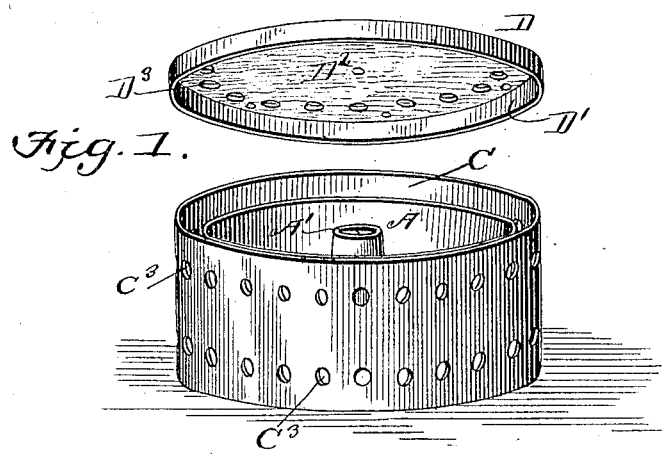
Fig. 1.
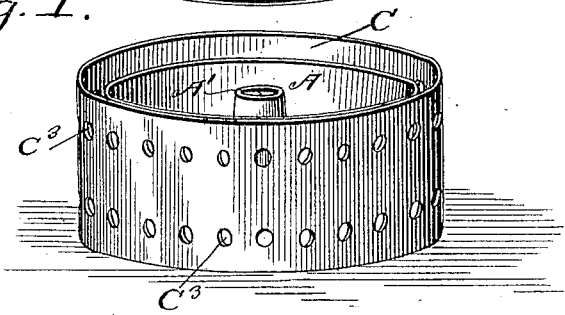
Fig. 2.
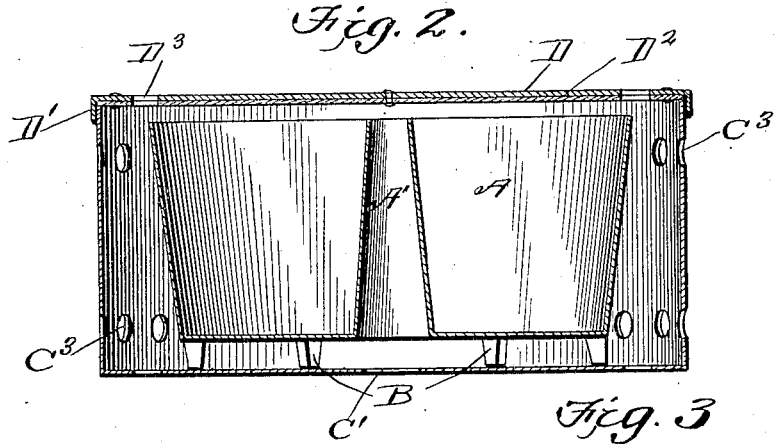
Fig. 4.
Fig. 3.
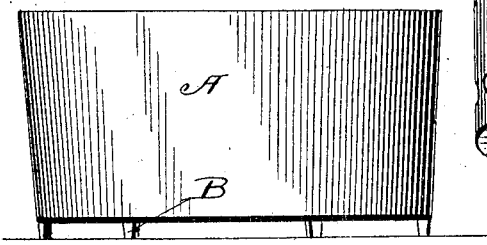
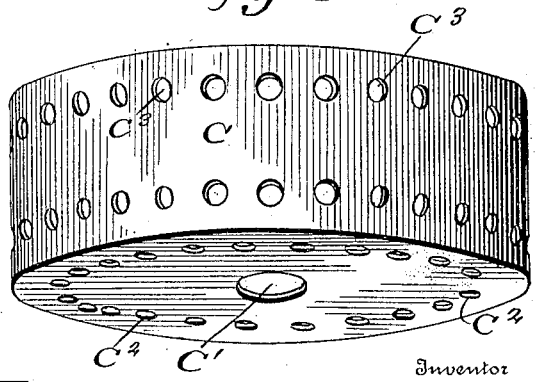
Fig. 5.
Witnesses
M. D. Blondel.
E. B. McBath.
Inventor
Emma Morrow.
By O'Meara & Brock
Attorneys

UNITED STATES PATENT OFFICE.

EMMA MORROW, OF SOMERSET, KENTUCKY.

BAKING-PAN.

No. 851,826.  Specification of Letters Patent.  Patented April 30, 1907.

Application filed August 16, 1904. Serial No. 220,950.

*To all whom it may concern:*

Be it known that I, EMMA MORROW, a citizen of the United States, residing at Somerset, in the county of Pulaski and State of Kentucky, have invented a new and useful Baking-Pan, of which the following is a specification.

This invention relates generally to baking pans and more particularly to one especially adapted for baking fruit cake, and the like.

The object of the invention is to provide a baking pan wherein the material being baked will be subjected to a uniform heat at all points, that is there will be the same degree of heat upon the top and sides of the cake, as there will be upon the bottom thereof.

With this object in view my invention consists essentially in the employment of an ordinary baking pan, provided with legs or feet, and arranged within a receptacle having a perforated top and bottom, and perforated sides, the top being lined with asbestos.

The invention consists also in certain details of construction, hereinafter fully described and pointed out in the claims.

In the drawings forming a part of this specification:—Figure 1 is a perspective view of a baking pan constructed in accordance with my invention, the top being removed. Fig. 2 is a vertical sectional view. Fig. 3 is an inverted perspective view of the outer receptacle. Fig. 4 is a side elevation of the inner receptacle or pan proper, and Fig. 5 is a detail view showing a fragment of a slight modification.

In carrying out my invention, I employ an inner receptacle A, provided with the usual central flue A'. This pan A, is also provided with a series of legs or feet B, preferably about half an inch in height. This pan or inner receptacle A, is arranged within an outer receptacle C, somewhat larger in diameter and depth than the pan A, with legs attached. The bottom of this outer receptacle has a large central opening C', and a series of smaller openings C² disposed near the outer edge of the bottom, and the sides are perforated as shown at C³, adjacent their upper and lower edges.

D, indicates the cover having an overlapping edge D', and is provided with an asbestos lining D², said cover and lining being perforated adjacent the outer edge of the top as shown at D³.

The material to be baked is placed in the pan A, and this pan is then placed in the outer receptacle and the cover affixed. The entire device is then set in the oven and the contents of the pan A, will be exposed to equal degrees of heat, at the top, bottom and sides, and when baking a fruit cake, which requires a very long time, this even distribution of heat is of the utmost importance.

In Fig. 5 I have shown a very slight modification, in which the bottom of the outer receptacle is provided with a series of depressions C⁴, into which the legs or feet B, fit, thereby preventing the pan A, slipping from its proper position in case the device as a whole is moved in the oven.

Having thus fully described my invention, what I claim as new and desire to secure by Letters Patent is:—

A new article of manufacture, a cooking utensil comprising an outer receptacle having perforated bottom and sides, and a central opening, an inner receptacle provided with feet arranged in the outer receptacle, a central flue formed in the inner receptacle over the central opening in the outer receptacle, and a top provided with an asbestos lining arranged on the outer receptacle.

EMMA MORROW.

Witnesses:
SAM DENHAM,
CLARENCE SMITH.